United States Patent [19]

Ahdoot

[11] Patent Number: 5,546,668
[45] Date of Patent: Aug. 20, 1996

[54] LEVELING AND LOCKING PROFILE TRANSFER DEVICE

[76] Inventor: Ned M. Ahdoot, 6916 Kings Harbor Dr., Rancho Palos Verdes, Calif. 90275

[21] Appl. No.: 414,747

[22] Filed: Mar. 31, 1995

[51] Int. Cl.⁶ ........................................ G01B 5/20
[52] U.S. Cl. .................. 33/527; 33/552; 33/561.1; 33/514.2
[58] Field of Search .................. 33/527, 514.2, 33/333, 334, 343, 340, 354, 370, 526, 529, 551, 552, 553, 554, 561.1

[56] References Cited

U.S. PATENT DOCUMENTS

| | | | |
|---|---|---|---|
| 1,041,145 | 10/1912 | Moss | 33/561.1 |
| 1,261,438 | 4/1918 | Reinhardt | 33/561.1 |
| 2,523,647 | 9/1950 | Burk | 33/514.2 |
| 2,671,273 | 3/1954 | Barnes | 33/529 |
| 3,419,965 | 1/1969 | Madden . | |
| 3,483,629 | 12/1969 | English . | |
| 4,444,204 | 4/1984 | Bryant et al. | 33/514.2 |
| 4,700,487 | 10/1987 | Bogle . | |
| 4,956,924 | 9/1990 | Hu | 33/561.1 |

FOREIGN PATENT DOCUMENTS

| | | | |
|---|---|---|---|
| 330009 | 8/1903 | France | 33/514.2 |
| 242552 | 11/1925 | United Kingdom | 33/561.1 |
| 1239491 | 7/1971 | United Kingdom | 33/561.1 |

*Primary Examiner*—Christopher W. Fulton
*Attorney, Agent, or Firm*—Gene Scott

[57] ABSTRACT

A contour tracing device provides a housing unit which holds a series of parallel probe rods. The rods extend from the housing side walls, and are restrained to sliding, linear motion with respect to the housing. When the ends of the rods are pressed against a surface, they move relative to the housing so as to reflect the surface's contour and maintain their position until manual pressure is again applied. The device may include a lever for locking the rods in a desired configuration, thus preventing the rod positions from being inadvertently altered. The tracing device may include a level indicating device.

9 Claims, 3 Drawing Sheets

LEVELING AND LOCKING PROFILE TRANSFER DEVICE

BACKGROUND OF THE INVENTION

1. Field of the Invention

This invention relates generally to contour tracing devices and more particularly to an improved tracing device with an integral leveling and locking means which thus allows the profile of a surface to be duplicated and transferred with improved accuracy.

2. Description of Related Art

Invention and use of contour tracing devices are known to the public, as they are frequently used to aid in the installation of tiles, marble, linoleum, etc. Typically, to accurately install floor or wall coverings such as tile, whole tiles are first laid in the center of the surface, and are then gradually laid outwardly toward the outer edges. Once all the whole tiles have been laid, portions of tile must be laid between the last whole tile and the surface edge, which is frequently defined by a wall. Since the shape and size of every surface is different, the exact shape of the tile portions also must vary with each surface. Thus it is necessary to determine, with precision, the exact shape required of each tile piece. To accomplish this, the contour distance from the wall to the adjacent edge of the last whole tile must be measured. Unfortunately, taking these measurements is meticulous and time consuming, and can result in costly errors due to incorrect measurement of tiles. It is particularly difficult to achieve an accurate measurement with tile and like surfaces, due to the curvature of the tile. longitudinal sides and a plurality of sensing rods that are supported in the housing. The rods are parallel to one another and extend beyond both longitudinal sides of the housing. The housing is provided with a plurality of housing webs that are formed so that the sensing rods are arranged in groups between the webs. The housing also has outer sides provided with coupling projections and openings.

Hu, U.S. Pat. No. 4,956,924 discloses a gauge developer that has a flexible strip with magnetic substances or a magnetic coating. Pin holder portions are comprised of recessed holes formed by one surface of the strip being concave along its thickness dimension. Pins, upon insertion in the holes, are held in position by the friction of the hole walls and magnetic force from the magnetic layer, thereby allowing the pins to be maintained in position during use.

Maden, U.S. Pat. No. 3,419,965 discloses a profile tracer in which a number of longitudinally movable resilient linear rods are held and disposed together in side by side relation through a clamping device so that the tips of the rods assume the profile of any object against which they are pressed. The clamping means may include a fixed rigid integral projection that bears on the rods, the rods being held by resilient rubber cross members within the clamping means or by eccentric cam and roller means.

However, while these, and other prior art contour tracers help to more quickly acquire contour measurements, they lack means for improved orientation, since they include no means by which to precisely level the device with respect to horizontal or vertical surfaces. In addition, none of the prior art devices include a means by which to fully ensure that the rods are rendered completely immobile until the traced contour measurement has been transferred. Thus, there is a need for an improved contour tracer. Such a tracer would

SUMMARY OF THE INVENTION

The present invention is a contour tracing device that is useful in the installation of tiles, marbles, linoleum and the like. The tool is also useful in the installation of roof tiles and shingles, as well as in several other plumbing and carpentry applications wherever an accurate contour need be transferred.

The present inventive tracing device preferably is constructed as an open, U-shaped housing having a top plate and two parallel side wall. A linear series o f paired corresponding apertures are positioned in the side walls, and an elongate probe rod is positioned through each pair of mating apertures in the housing side walls. Each probe rod is able to slide linearly through its pair of apertures with respect to the housing. In order to measure the contour of a given surface with the tracer, the device is leveled using the built in bubble levels, and then the tips of the rods are simply pressed against a surface to be contoured thereby forcing the rods to move to positions duplicating the contour measured. Thus, it is an object of the present invention to significantly improve over standard measuring techniques by providing a device that can much more quickly and accurately measure the contour of a given surface in a single, simple procedure.

A key inventive feature of the present invention is the addition of one or more bubble level vials, which are preferably positioned in the tracer's top plate so that they are clearly visible. Preferably, two vials are positioned in the top plate in orthogonal juxtaposition so as to provide for both level and plumb positioning. Thus, it is a primary object of the present invention to improve over the prior art tracing devices by providing a contour An important element of the present invention is a pressure pad included within the housing so as to exert pressure on the rods and keep them from sliding freely through the apertures. The pressure exerted by the pad is great enough so that the rods generally remain in place when the device is picked-up, transported or otherwise moved or handled, thus allowing the rods to slide through the apertures only when direct pressure is applied to the rods. Thus it is an object of the invention to ensure that the rods remain in a relatively fixed position until otherwise physically acted upon.

For even greater assurance that the rods will remain as positioned, the tracer preferably includes a pressure exerting means designed to lock the rods in position after the surface contour has been traced, thus ensuring that the contour measurement is not inadvertently lost or distorted. The pressure exerting means is preferably a pressure plate acted upon by at least one lever that is easily manually moved between a pressure release position and a pressure exerting position. When in the pressure exerting position, the pressure exerting means moves a rigid pressure plate downwardly against the pressure pad, thus causing the pad to more firmly contact and more fully stabilize the probe rods. Thus, it is an object of the invention to include a means by which to firmly lock the probes in a desired longitudinal position, thus ensuring that a measurement will not be o inadvertently altered before the measurement can be utilized. When the measurement is no longer needed, the pressure exerting means is simply moved into the pressure release position, which retracts the pressure plate from the pressure pad. In this position, the probes are still restrained from inadvertent sliding movement by the normal functioning of the pressure pad. Thus it is one object of the current invention to provide a means for locking a contour position of the rods into place to assure fidelity in contour transfer. Thus it is an object of the present invention to at once prevent the rods from freely sliding through the apertures, and yet enable the rods to slide easily when direct pressure is applied to the ends of the rods.

As described above, the housing preferably has an open, U-shaped construction. This construction allows a user quick and convenient access to the interior of the housing, so as to easily replace the pressure pad, low friction material or pressure exerting means as needed. Thus, it is an object of the invention to provide a tracing device which is more practical in use and economical to manufacture and maintain.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the invention. In such drawings.

DETAILED DESCRIPTION OF THE PREFERRED EMBODIMENT

Figure 1:
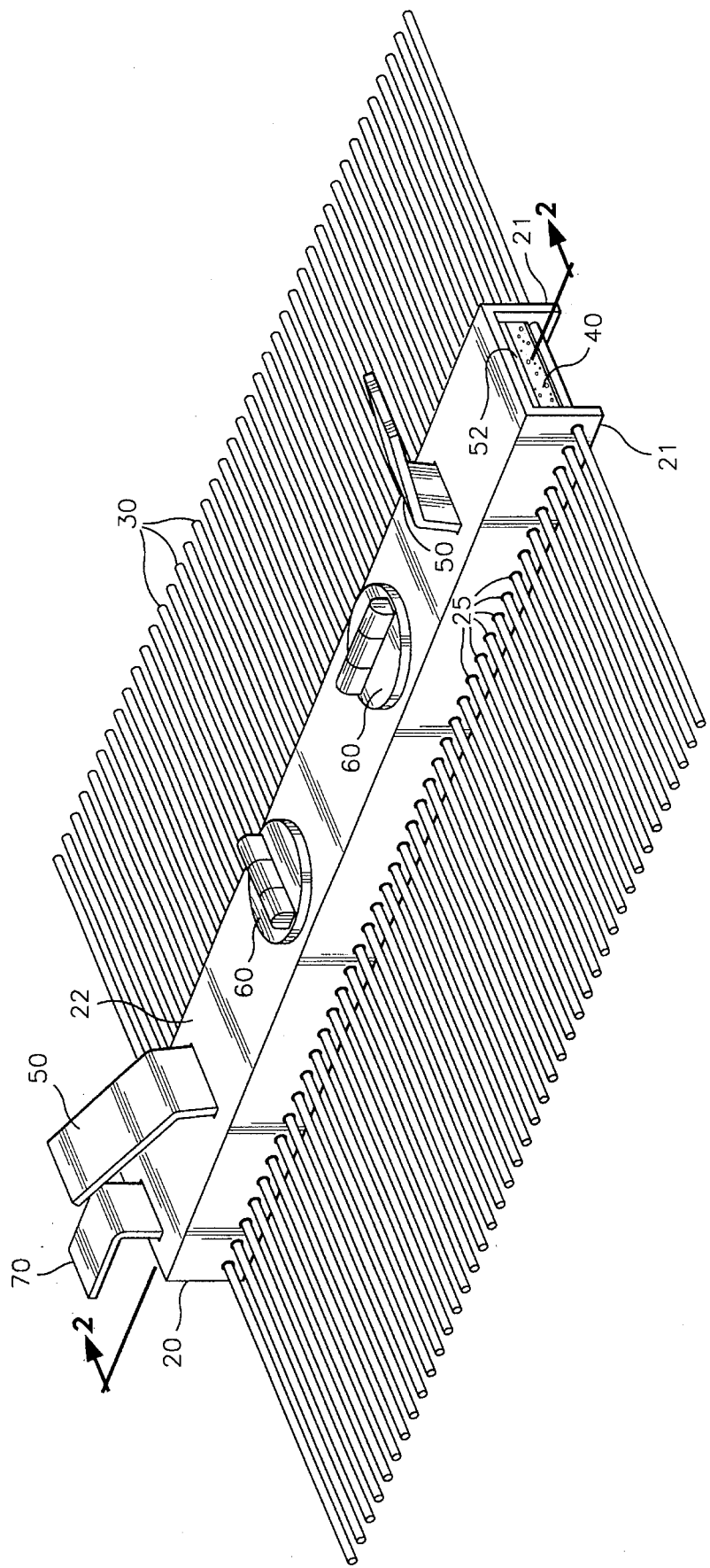
FIG. 1 is a perspective view of the preferred embodiment of the present invention.
Figure 2:
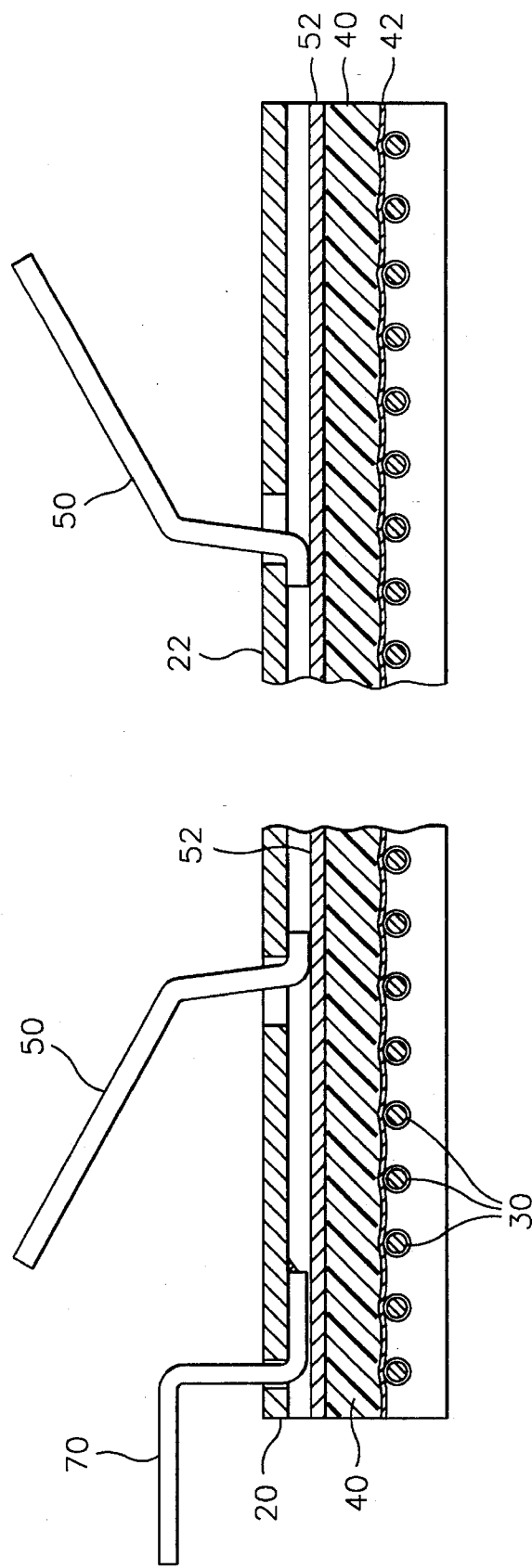
FIG. 2 is a broken and partial cross-sectional view taken along line 2—2 in FIG. 1 particularly showing a pressure plate and plate engaging means of the invention wherein the pressure plate is shown in a pressure released position.
Figure 3:
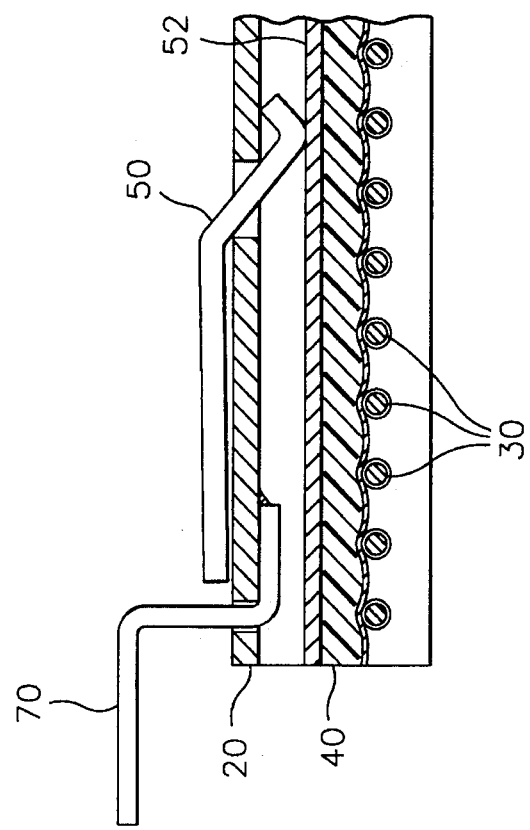

FIGS. 1 and 2 show the preferred mode of the present inventive contour tracer designed to provide an accurate, referenced measurement of a surface's contour.

The contour tracer preferably includes an elongate, rectangular housing 20 that has a top plate 22 and parallel sides 21, thus giving the housing 20 a U-shaped structure. The housing 20 is preferably constructed of a single piece of sheet metal or of rigid, molded plastic. Additionally, the housing 20 may be manufactured to include a bottom plate and end plates so as to form an enclosed housing unit (not shown).

Apertures 25 are spaced along each of the housing sides and are aligned in corresponding pairs between the sides, and a series of probe rods 30 are fitted through the apertures 25 so that each probe rod 30 extends out from each side 21 of the housing 20. A uniform distance of approximately 1/16 inch is provided between each adjacent aperture 25, said distance being found to be advantageous for fine tracing of a surface. However, tracers may be manufactured with greater or less distance between apertures 25, depending on the accuracy necessary for the intended use of the tracer. The diameter of the apertures 25 is selected to allow the probe rods 30 to move freely therethrough while establishing a snug fit so that the rods cannot easily fall out of the housing.

The probes 30 are preferably made of a rigid metal or plastic in a spring temper. All of the probes 30 are of an equal length sufficient for common measurements required by craftsman. Preferably the probes are constructed with a length between 3 and 12 inches, thus accommodating surface contours with little and with large variations. the rods 30. Additionally, a low friction layer 42 is preferably placed between the pressure pad 40 and the rods 30 so as to allow the rods 30 to slide more easily during the contouring process and to lessen wear on the pressure pad 40.

To lock the rods 30 at a selected position, the contour tracer preferably includes a rigid pressure plate 52 situated between the top plate 22 and the pressure pad 40. A pressure exerting means 50 forces the pressure plate 52 against the pressure pad 40. As illustrated in FIG. 2, the pressure exerting means 50 is preferably comprised of at least one lever arm 50 that may be alternately positioned between a pressure exerting position and a pressure release position. When the lever arm 50 is moved to the pressure exerting position, the pressure plate 52 is pressed downwardly against the pressure pad 40, thus firmly locking the probe rods 30 in the desired position. When the lever arm 50 is moved to the pressure release position, the pressure plate 52 is retracted and the rods are restrained from free linear movement by the pressure pad 40 alone.

The top plate 22 preferably includes two bubble level vials 60, as best seen and illustrated in FIG. 1. Preferably, one of the vials 60 is mounted transversely on the top plate 22, and the other of the level bubbles 60 is mounted longitudinally on the top plate 22, thus enabling the invention to be set level in a horizontal plane or in a vertical plane.

A handle 70 is preferably secured to the top plate 22 so as to easily hold, carry and manipulate the tracer.

Thus, to use the present inventive contour tracer to duplicate the contour of a given surface, the pressure exerting means 50 is moved into the pressure release position, and the probe rods 30 are pressed against a surface to be replicated or transferred, so that they position and are incapable of linear movement. The tracer can then be picked up by means of the handle 70 and moved to a desired location for transferring the set contour. Contour transfer is accomplished by simply establishing the ends of rods 30 at a point where the contour is to be cut into a workpiece, and then moving a marking device such as a pencil along the ends of the rods. A smooth contour line is then transferred to the workpiece in preparation for cutting the contoured edge.

When it is then desired to trace the contour of another surface, the pressure exerting means 50 is simply moved into the pressure release position, thus releasing the probes 30 So that they may conform to the contour of the surface, and the process is repeated.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A contour tracer comprising:
    an elongate U-shaped housing having a top plate and opposing side walls, the walls each having at least one side aperture aligned longitudinally;
    a series of linear probe rods fitting slidably through the side apertures, each of the probe rods being engaged in the apertures and freely movable laterally therein;
    compressed between the top plate and the rods, a pressure pad of resilient material exerting pressure on the rods such that the rods require a determined force to be repositioned in the housing;
    a low friction, flexible and wear resistant layer between the pressure pad and the rods, the rods being in contact with the layer.

2. The contour tracer of claim 1 wherein the pressure pad is formed from resilient material self-expansive under compression.

3. The contour tracer of claim 1 further comprising a handle secured to the top plate and extending upwardly therefrom.

4. The contour tracer of claim 1 further comprising at least one leveling means attached to the top plate enabling the positioning of the rods in a horizontal plane or a vertical plane.

5. The contour tracer of claim 4 wherein the leveling means is a pair of orthogonally set bubble level vials.

6. The contour tracer of claim 1 further comprising a rigid pressure plate between the top plate and the pressure pad and a pressure exerting means for forcing the pressure plate against the pressure pad.

7. The contour tracer of claim 6 wherein the pressure exerting means comprises at least one lever arm positioned in cooperation with the top plate to exert leverage between the top plate and the pressure plate forcing the pressure plate downwardly against the pressure pad.

8. The contour tracer of claim 7 wherein the top plate further comprises at least one top aperture for receiving the at least one lever arm the lever arm terminating with a V-shaped portion, the V-shaped portion cooperating with the top aperture such that in a first, pressure release, lever arm orientation, with the lever arm extending away from the U-shaped housing, the pressure plate is maintained in a relatively relaxed state, and with the lever arm positioned in a second, pressure exerting, orientation against the U-shaped housing, the pressure plate is forced against the pressure pad, the V-shaped portion being interposed between the housing and the pad.

9. The contour tracer of claim 6 further comprising a low friction, flexible and wear resistant layer between the pressure pad and the rods, the rods being in contact with the layer.

* * * * *